Patented Dec. 19, 1944

2,365,173

UNITED STATES PATENT OFFICE 2,365,173

STARCH ESTERIFICATION

George V. Caesar, Staten Island, N. Y., assignor to Stein, Hall and Company, Inc., New York, N. Y., a corporation of New York No Drawing. Application November 24, 1941, Serial No. 420,211

5 Claims. (Cl. 260—234)

This invention relates to a new and improved method of esterifying starch, and more particularly to the acetylation of starch. It relates also to certain new and improved products.

Starch occurs in nature in microscopic packages or granules of different sizes, shapes and states of micellar organization or "packing." The alpha-glucopyranose polymers of which it appears to be composed may exist in the form of more or less extended or compressed helical springs, associated through hydrogen bonds in O—H . . . O linkages to form, possibly, ropelike micellar aggregates which constitute the building block or units of the granular package. In this connection reference is here made to an article entitled, "The Starch Molecule" by Caesar and Cushing, Journal of Physical Chemistry 45, 776 (1941).

Esterification processes involve the reaction of an alcohol with an acid. In the case of starch it may be expressed by the general equation:

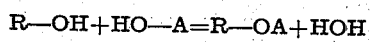

R—OH+HO—A=R—OA+HOH wherein R represents a starch residue and A represents the residue of an acid.

The availability of the hydroxyl or OH groups on starch is a principal factor in reaction velocity. This consideration has been generally overlooked in chemical reactions involving starch. The tiny highly organized packages or granules offer minimum surface area, and the reacting hydroxyl groups are profoundly associated. Consequently the reaction velocity of esterification processes such as, for example, acetylation, is greatly impeded.

As a result of the inherent characteristics of the starch granule, esterification processes such as, for example, acetylation, have required rather long periods of time for completion.

One of the objects of the present invention is to provide a new and improved process for carrying out starch acetylation reactions more efficiently.

Another object of the invention is to provide a method of carrying out certain specific starch acetylation reactions whereby products of better chemical purity and stability are obtained.

A further object is to produce starch esters in improved physical form.

A more specific object of the invention is to provide a new and rapid method of producing acetylated starches.

In accomplishing these objects in accordance with this invention it has been found that new and improved results are obtained in starch esterification reactions, in particular, through the use of phosphoric acid as a dispersing and/or dehydrating agent, in place of sulfuric acid. Although the invention is not limited to any theory, it is probable, based upon the unique hydroxylated structure of orthophosphoric acid, that this acid, while substituting for sulfuric acid as a dehydrating agent, is more effective as a starch dispersing or disorganizing agent, and that disorganization of the starch structure promotes the efficiency of ester formations. It is believed that the large and probably associated molecules of phosphoric acid combine with the starch through OH . . . O linkages, or in part form a type of labile ester, the net effect being a disorganization of the tightly organized starch package. Initial dispersion of starch in the phosphoric is preferable, although in certain types of esterification it is also practicable to react the starch or amylaceous substance with a suitable mixture of phosphoric and ester-forming acid.

In the practice of the invention it has been found that through suitable use of concentrated phosphoric acid complete acetylation of starch to the starch triacetate was practically instantaneous, whereas, normal reaction processes to the triacetate consumed a number of hours.

The invention will be further understood but is not limited by the following example in which the quantities are stated in parts by weight unless otherwise indicated:

Example

Fifty (50) parts of powdered corn starch were dispersed in 200 parts of 85% phosphoric acid, and reacted with 400 parts of a mixture of 60% acetic anhydride and 40% glacial acetic acid, by volume, to which was added a trace of concentrated sulfuric acid (0.05% by volume). A precipitate formed, which was rapidly dissolved, as the temperature rose rapidly to about 105° C. The boiling mixture was then poured into a large volume of cold water, precipitating the starch acetate. Esterification was completed in less than 5 minutes. Acyl determination was 43.9% acetyl value, or 98% starch triacetate. The washed and neutralized product was completely soluble in acetone or nitromethane, and the viscosity of a 10% solution in nitromethane was 41.7 centistokes at 10° C. The viscosity of a commercial sample of starch triacetate at this concentration and temperature, in the same solvent, was 12.5 centistokes.

It will be understood that the invention is subject to variation and modification in the manner of its practical application. Thus, the particular type of starchy material may be varied, for example, the starch may be derived from corn, wheat, oats, rye, barley, white potato, sweet potato, rice, tapioca, sago and other types of starches and flours. Suitable starch derivatives may also be employed, such as are obtained by the action on starch of heat, acids, enzymes, etc. The term "amylaceous" is used herein to cover broadly raw starches and starch derivatives.

The concentration of the phosphoric acid may vary somewhat depending upon other factors such as, for example, the particular type of amylaceous substance employed, but ordinarily it is preferably to employ a relatively concentrated acid, say, an acid having a concentration of about 85% or more, for the reason that water is one of the by-products of the reaction, and hence, the presence of two much water initially is undesirable.

In the practice of the invention it is preferable first to disperse the amylaceous material in the phosphoric acid. This is particularly true of acetylation technique.

The type of esterifying agent may vary, depending, for example, upon the particular esterification reaction. Thus, for acetylations, it is preferable to employ a mixture of acetic anhydride and glacial acetic acid, plus a small amount of a catalyst such as sulfuric acid. Any other known catalyst for this reaction may be used. In the processes of my invention, the phosphoric acid also serves as a dehydrating agent.

The temperature and pressure of the reactions may vary, the course of the reactions following the laws of thermodynamics. In the case of the acetylation of amylaceous materials, in accordance with this invention, the reaction of the phosphoric acid-starch dispersion with the mixture of acetic acid and acetic anhydride is intensely exothermic. This intense and rapid evolution of heat is a trigger action which touches off a complete acylation. In the case of various other anhydrides and acids, the heat generated may be insufficient to promote this abnormal reaction velocity characteristic of my process.

The invention has a number of outstanding advantages in the preparation of specific starch esters. Thus, in the preparation of starch acetates, one of the principal advantages is the exceptional rapidity with which the reaction proceeds to completion, acetylation of starch to the triacetate being normally a very slow process.

Having thus described the invention, what I claim as new and desire to secure by Letters Patent of the United States is:

1. In the art of making amylaceous acetates, the steps which comprise dispersing an amylaceous substance in a dispersing medium comprising principally phosphoric acid and then acetylating the resultant dispersion.

2. The method of making starch acetates which comprises substantially dispersing a starch in a dispersing medium comprising principally phosphoric acid and pouring the resultant product into an acetylating agent comprising acetic acid, acetic anhydride, and a catalyst.

3. The method of making starch acetates which comprises substantially dispersing a starch in a dispersing medium comprising principally phosphoric acid and pouring the resultant product into an acetylating agent comprising acetic anhydride.

4. A method of preparing a starch triacetate which comprises dispersing a raw starch in approximately 85% phosphoric acid, said phosphoric acid constituting the major proportion of said dispersion, then pouring the resultant dispersion rapidly into an acetylating mixture comprising acetic anhydride, acetic acid, and a little sulfuric acid, said acetic anhydride comprising the major proportion of said acetylating mixture, whereby the temperature of the resultant mixture rises, pouring the hot mixture into a larger volume of cold water and separating the starch acetate thereby precipitated.

5. In the art of preparing starch acetates, the steps which comprise dispersing a starch in a relatively larger amount by weight of a dispersion medium comprising principally phosphoric acid and thereafter acetylating the resultant dispersion with acetic anhydride.

GEORGE V. CAESAR.